(12) United States Patent
Jawwad et al.

(10) Patent No.: US 11,770,301 B2
(45) Date of Patent: Sep. 26, 2023

(54) CONFIGURING NETWORK NODES IN COMMUNICATION NETWORK

(71) Applicant: Telefonaktiebolaget LM Ericsson (publ), Stockholm (SE)

(72) Inventors: Ahmed Jawwad, Kista (SE); Lackis Eleftheriadis, Valbo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/784,662

(22) PCT Filed: Dec. 16, 2019

(86) PCT No.: PCT/SE2019/051285
§ 371 (c)(1),
(2) Date: Jun. 12, 2022

(87) PCT Pub. No.: WO2021/126019
PCT Pub. Date: Jun. 24, 2021

(65) Prior Publication Data
US 2023/0012248 A1 Jan. 12, 2023

(51) Int. Cl.
*G06F 15/173* (2006.01)
*H04L 41/0866* (2022.01)
*H04W 24/02* (2009.01)

(52) U.S. Cl.
CPC ......... *H04L 41/0866* (2013.01); *H04W 24/02* (2013.01)

(58) Field of Classification Search
CPC .... H04L 41/0866; H04W 24/02; G06N 20/00
See application file for complete search history.

(56) References Cited

U.S. PATENT DOCUMENTS

2015/0339132 A1* 11/2015 Chen ..................... G06F 15/177
713/100
2017/0261949 A1 9/2017 Hoffmann et al.
(Continued)

FOREIGN PATENT DOCUMENTS

CN 1822037 A * 8/2006 .......... G06F 11/3409
CN 105138621 A * 12/2015 ............. G06F 16/21
(Continued)

OTHER PUBLICATIONS

International Search Report and Written Opinion of the International Searching Authority, PCT/SE2019/051285, dated Dec. 4, 2020, 13 pages.
(Continued)

*Primary Examiner* — Richard G Keehn
(74) *Attorney, Agent, or Firm* — Sage Patent Group

(57) ABSTRACT

A cluster computing device is defined, associated with a plurality of network nodes of the communications network, and it generates a performance model relating configuration parameters of a network node to at least one energy performance parameter of the network node. The cluster computing device transfers the generated performance model to the plurality of network nodes, and then receives information from network nodes, indicating configuration parameters and at least one energy performance parameter of the respective network node. When the cluster computing device identifies a first network node as having a poor performance, it also identifies a second network node as having a good performance, and it causes the first network node to operate with cloned configuration parameters of the second network node.

18 Claims, 6 Drawing Sheets

(56) References Cited

U.S. PATENT DOCUMENTS

2019/0050515 A1   2/2019  Su et al.
2023/0111860 A1*  4/2023  Condoluci .............. H04W 4/44
                                                370/252

FOREIGN PATENT DOCUMENTS

| CN | 109151864 A | * | 1/2019 | ............ H04L 67/10 |
| CN | 109218087 A | * | 1/2019 | |
| CN | 110378487 A |   | 10/2019 | |
| EP | 2107838 A1 |   | 10/2009 | |
| EP | 3352414 A1 |   | 7/2018 | |
| EP | 3445104 A1 |   | 2/2019 | |
| GB | 2536328 A | * | 9/2016 | ............ H04W 8/245 |
| WO | 2009096835 A1 |   | 8/2009 | |
| WO | 2012167817 A1 |   | 12/2012 | |

OTHER PUBLICATIONS

Farnaz, M., et al., "Performance Prediction in Dynamic Clouds Using Transfer Learning," 2019 IFIP/IEEE International Symposium on Integrated Network Management (IM2019) 9 pages.

Greiner, R., et al., "Knowing What Doesn't Matter: Exploiting the Omission of Irrelevant Data," Elsevier, Artificial Intelligence 97 (1997) Received Nov. 1995, Revised Nov. 1996, 36 pages.

Konečný, J., et al., "Federated Learning: Strategies for Improving Communication Efficiency," NIPS Workshop on Private Multi-Party Machine Learning (2016) 10 pages.

Extended European Search Report, European Application No. 19956861.9, dated Aug. 8, 2023, 12 pages.

* cited by examiner

CONFIGURING NETWORK NODES IN COMMUNICATION NETWORK

CROSS REFERENCE TO RELATED APPLICATIONS

This application is a 35 U.S.C. § 371 national stage application of PCT International Application No. PCT/SE2019/051285 filed on Dec. 16, 2019, the disclosure and content of which is incorporated by reference herein in its entirety.

TECHNICAL FIELD

This relates to a communications network, and in particular to the configuration of network nodes of the communications network.

BACKGROUND

In a communications network, it is desirable to provide real-time service assurance, so that a flexible network infrastructure is robust and highly available, ensuring low latency and agreed service quality to its customers. A service assurance system for communications services may be able to detect and localize problems that may violate the agreed service quality in real-time, as well as cause high energy consumption or system overload. This allows analysis of the root cause of the problems, so that mitigation actions can be taken to remedy the detected faults and restore the violated service as soon as possible, in order to minimize the impact of potential penalties from violations of an agreed service. This should preferably be done with a scalable solution keeping in mind the latency and real-time requirements.

In one existing system, a Federated Learning model is used. That is, network elements, such as radio base stations or other radio access nodes are each provided with a statistical model that can predict such things as quality-of-service (QoS) parameters for a user application and compliance with a Service Level Agreement (SLA). The document "Federated Learning for wireless communications: Motivation, Opportunities and Challenges", Solmaz Niknam, Harpreet S. Dhillon, and Jeffery H. Reed, arXiv preprint arXiv:1908.06847 (2019) discusses the application of Federated Learning to wireless communications applications.

The statistical model can be trained initially by the equipment manufacturer on all of the available data, and one copy of that model can be deployed locally on each network element (for example each radio base station or other radio access node), and possibly by multiple customers (for example communications network providers). When the system is live, each network element runs its copy of the model, and gathers observational data relating to the operation and behavior of the network element. This allows the network element to learn from the live operation, and to refine its statistical model based on the new data. Specifically, the network element may modify the weights etc. in its local model.

Each network element can then inform a central server node in its network, or the equipment manufacturer, about its refinement of the statistical model. This allows the new learnings from all of the local models to be aggregated. In the case where the equipment is deployed with multiple customers, this allows the new learnings from all of the local models to be aggregated without any customer data needing to be shared with the equipment manufacturer or with other customers.

The model produced by the generated central server node, or the equipment manufacturer, can then be updated and improved, based on the aggregated refinements provided by the individual local sites. This updated model can then be distributed to the local sites as required.

This has the disadvantage that nodes with significantly different hardware and/or software configurations may exist, and so it may not be appropriate for the local model of one network node to be updated based on the refinements that another network node has made to its local model.

In any event, there may be hundreds of thousands of sites in an overall network, and so this aggregation can still run into scalability issues.

SUMMARY

According to a first aspect of the present disclosure, there is provided a method of operation of a communications network. The method comprises, in a cluster computing device, generating a performance model for a plurality of network nodes of the communications network, wherein the performance model relates configuration parameters of a network node to at least one energy performance parameter of the network node. The generated performance model is transferred to the plurality of network nodes. Information is received from the plurality of network nodes, said information indicating configuration parameters and at least one energy performance parameter of the respective network node. A first network node of said plurality of network nodes is identified as having a poor performance. Then, a second network node of said plurality of network nodes is identified as having a good performance. The cluster computing device causes the first network node to operate with cloned configuration parameters of the second network node. The method further comprises, in a local client computing device (70, 72, 74, 76) associated with the second network node, transmitting configuration parameters of the second network node to the first network node. The method further comprises, in a local client computing device associated with the first network node, receiving configuration parameters from the second network node, and setting the configuration parameters of the first network node to correspond to the configuration parameters received from the second network node.

The method may further comprise, in a central server computing device in the communications network, receiving information from network nodes of the communications network; performing a clustering process such that network nodes with similar properties are clustered together; and defining a plurality of cluster computing devices, each associated with a respective cluster comprising a respective plurality of said network nodes of the communications network.

The network nodes may be radio access nodes of a telecommunications network.

According to a further aspect, there is provided a communications network, the network comprising a plurality of processors and suitable memory, the memory containing instructions executable by the processors such that the network is operable to perform a method in accordance with the first aspect.

According to a second aspect of the present disclosure, there is provided a method of operation of a computing device in a communications network. The method comprises generating a performance model for a plurality of network nodes of the communications network, wherein the performance model relates configuration parameters of a network node to at least one energy performance parameter of the network node. The generated performance model is then transferred to the plurality of network nodes. Information is received from the plurality of network nodes, said information indicating configuration parameters and at least one energy performance parameter of the respective network node. The computing device identifies a first network node of said plurality of network nodes as having a poor performance. The computing device also identifies a second network node of said plurality of network nodes as having a good performance, and causes the first network node to operate with cloned configuration parameters of the second network node.

The method may comprise causing the first network node to operate with cloned configuration parameters of the second network node by instructing the second network node to send said configuration parameters to the first network node.

The method may comprise instructing the second network node to send said configuration parameters over the X2 interface to the first network node.

The method may comprise updating the generated performance model based on information received from the plurality of network nodes.

The network nodes may be radio access nodes of a telecommunications network.

According to a further aspect, there is provided a computing device, the computing device comprising a processor and a memory, the memory containing instructions executable by the processor such that the computing device is operable to perform a method in accordance with the second aspect.

According to a third aspect of the present disclosure, there is provided a method of operation of a network node in a communications network. The method comprises receiving information from a cluster computing device, said information defining a performance model, wherein the performance model relates configuration parameters of the network node to at least one energy performance parameter of the network node. The method further comprises setting the configuration parameters of the network node based on said performance model; updating said performance model, based on the at least one energy performance parameter of the network node; and when instructed by said cluster computing device, sending said configuration parameters to at least one other network node, or, when receiving configuration parameters from another network node, setting the configuration parameters of the network node to correspond to the configuration parameters received from the other network node.

The method may comprise sending information about updates of said performance model to the cluster computing device.

The method may comprise sending said configuration parameters over the X2 interface to said plurality of network nodes.

The network node may be a radio access node of a telecommunications network.

According to a further aspect, there is provided a network node, the network node comprising a processor and a memory, the memory containing instructions executable by the processor such that the apparatus is operable to perform a method in accordance with the third aspect.

According to a further aspect, there is provided a computer program comprising instructions which, when executed on at least one processor, cause one or more processor to carry out a method according to the first or second aspect.

According to a further aspect, there is provided a carrier containing a computer program according to the previous aspect, wherein the carrier comprises one of an electronic signal, optical signal, radio signal or computer readable storage medium.

According to a further aspect, there is provided a computer program product comprising a tangible and/or non transitory computer readable medium having stored thereon a computer program according to the previous aspect.

DETAILED DESCRIPTION

Embodiments will now be described with reference to the accompanying drawings. It will be appreciated that these embodiments are provided by way of example only, and that variations and modifications may be made within the scope of the invention as defined by the claims.

As discussed above, the method described herein relates to the operation of a communications network, comprising a plurality of network nodes. The communications network may be any form of communications network. By way of example, the method will be described with reference to one specific embodiment, in which the communications network is a cellular telecommunications network, and the network nodes are radio access nodes of the cellular telecommunications network.

Figure 1:
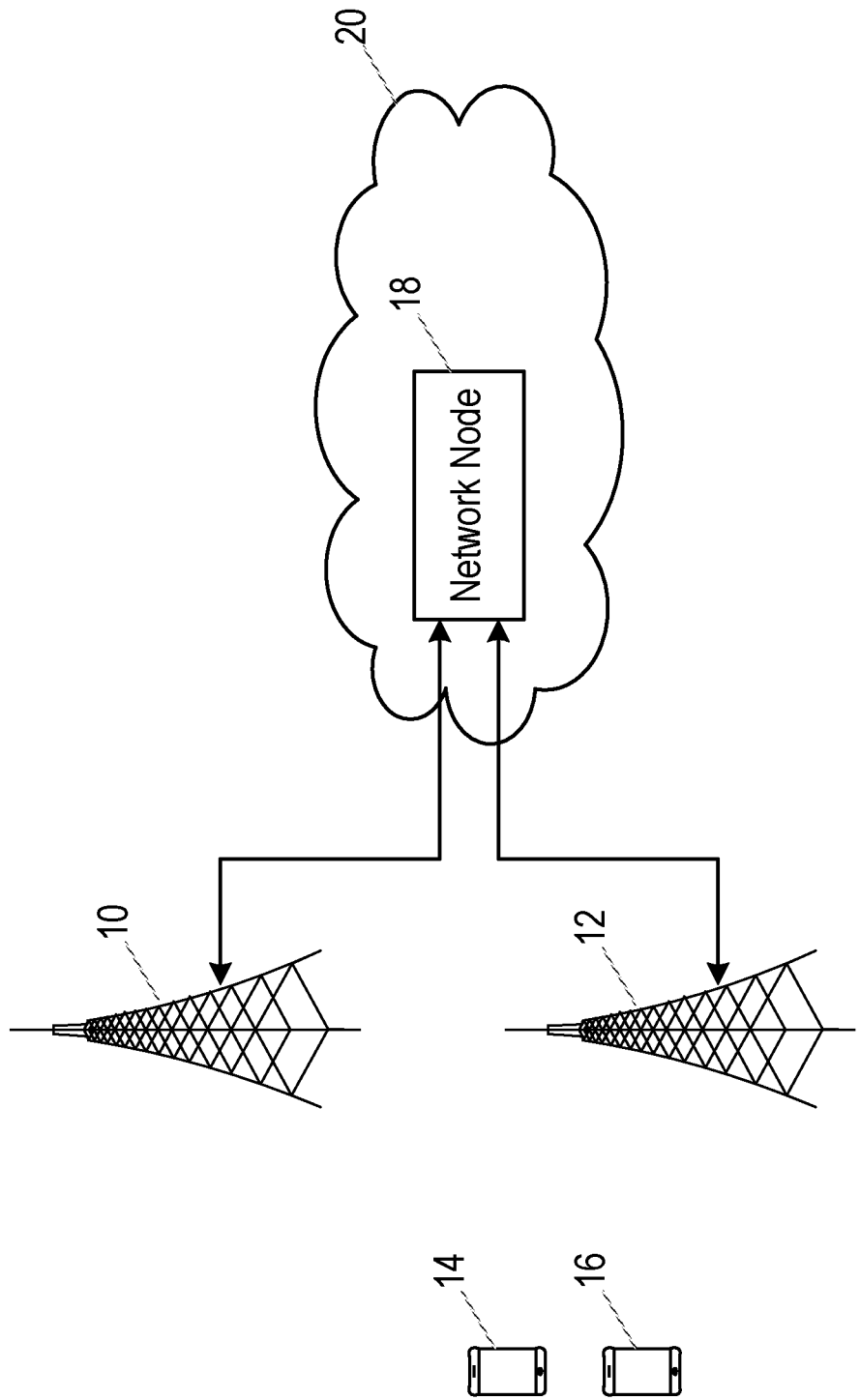
FIG. 1 illustrates a part of a cellular communications network.

FIG. 1 illustrates a part of a cellular telecommunications network.

Specifically, FIG. 1 shows a plurality of radio base stations 10, 12, acting as radio access nodes in the cellular telecommunications network. The radio access nodes provide a cellular service to a plurality of wireless devices or User Equipment devices 14, 16. It will be appreciated that a real network will include many more radio access nodes and wireless devices than are shown in FIG. 1. The base stations 10, 12 are connected to a network node 18 in a core network 20 of the cellular telecommunications network.

Figure 2:
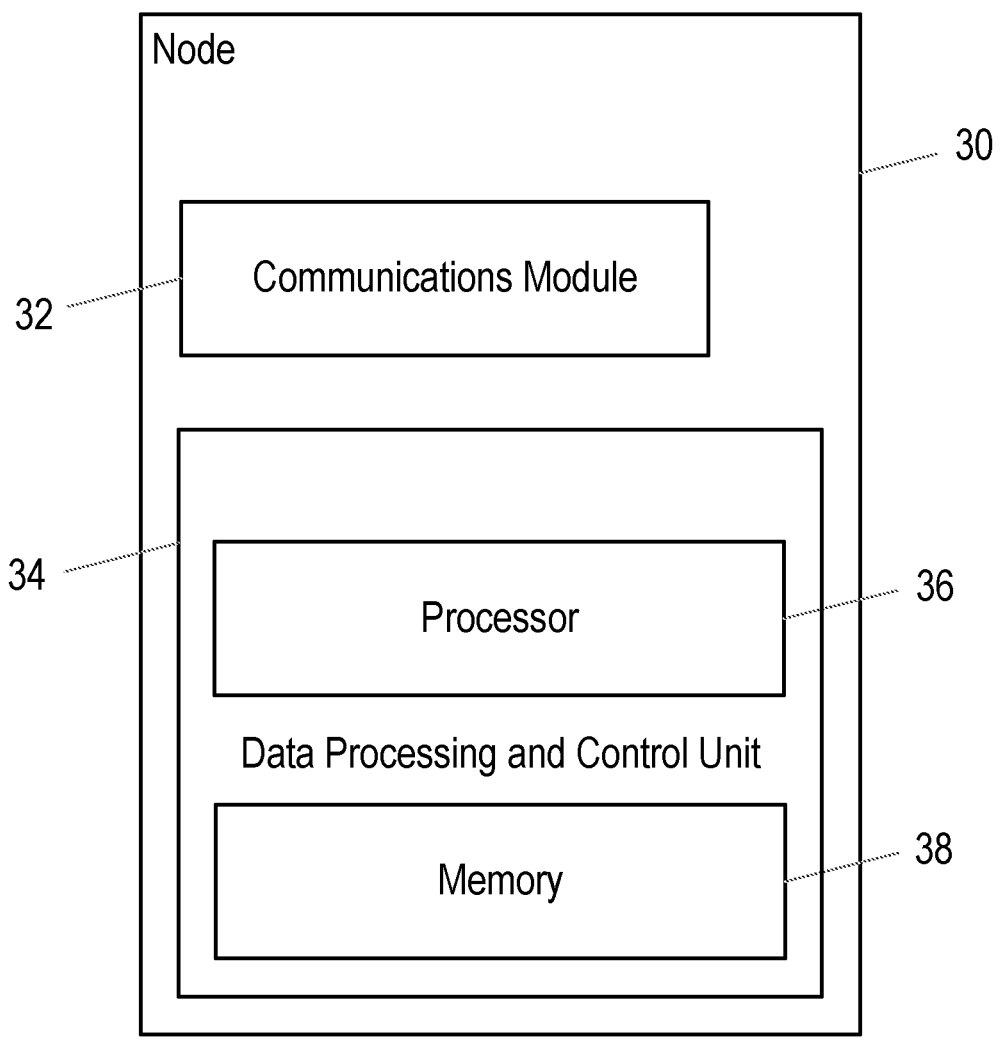
FIG. 2 is a schematic diagram of a network node.

The methods of the present disclosure may be conducted in a suitable apparatus at one or more nodes of the telecommunications network. FIG. 2 illustrates an example apparatus 30 which may implement the methods described herein, for example on receipt of suitable instructions from a computer program. Referring to FIG. 2, the apparatus 30 comprises a communications module 32, and a data processing and control unit 34, which in turn comprises a processor 36 and a memory 38. The memory 38 contains instructions executable by the processor 36 such that the apparatus 30 is operative to conduct some or all of the steps of the methods.

An apparatus 30 as shown in FIG. 2 may be provided at the site of one or more of the radio base stations 10, 12. In addition, an apparatus 30 as shown in FIG. 2 may be provided at the network node 18 of the core network 20.

As described in more detail below, a modified form of Federated Learning technique is used to control the operation of the network nodes in the cellular telecommunications network. In general, Federated Learning involves multiple local network nodes training their respective local models of a system, using local data samples. The local network nodes each produce potential updates for the model parameters, and share these with a central server. The central server then aggregates the potential updates to generate a new global model of the system, and transmits that global model to the local network nodes for further training.

Figure 3:
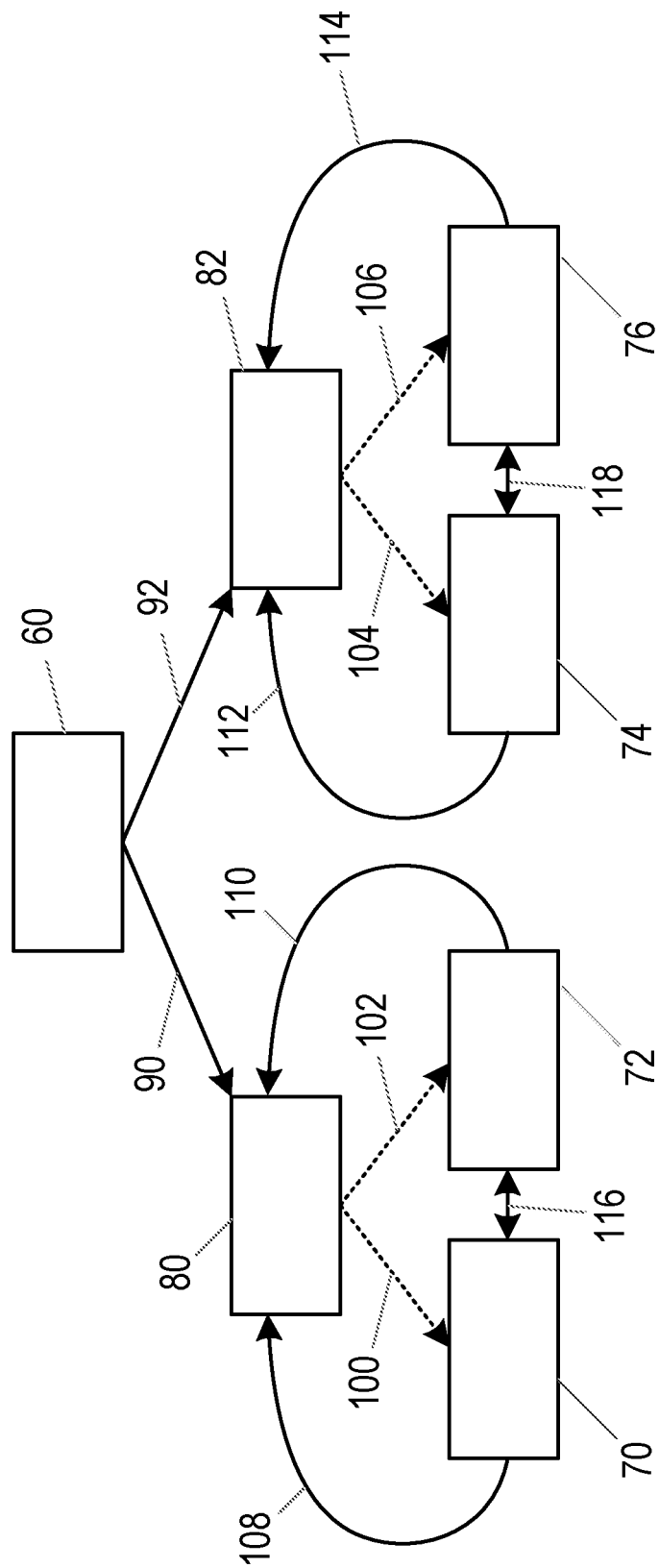
FIG. 3 illustrates an arrangement of network nodes in accordance with embodiments described herein.

FIG. 3 illustrates the operation of the modified form of Federated Learning technique.

Specifically, FIG. 3 shows a part of a communications network, in which there is a master server node or central server computing device 60, for example in a network manager, or Operations Support System (OSS) of the network.

In addition, there are multiple end local or client network nodes, for example in the form of Radio Base Stations or other radio access nodes in a 4G or 5G network, and these are located at respective customer sites. In the context of the Federated Learning technique, there are local client computing devices 70, 72, 74, 76 associated with these customer sites. The local client computing devices 70, 72, 74, 76 may be located at the sites of the network nodes, but the local client computing devices 70, 72, 74, 76 may be located away from the sites of the network nodes.

In addition, it is proposed here that the end client network nodes should be clustered, with each cluster having a corresponding logical cluster computing device 80, 82. In this illustrated example, the first cluster computing device 80 is connected to the local client computing devices 70, 72, and the second cluster computing device 82 is connected to the local client computing devices 74, 76. The cluster computing devices 80, 82 are connected to the central server computing device 60.

In some embodiments, the central server computing device 60 itself maintains the plurality of virtual cluster computing devices, with the functions of each cluster computing device being kept separate from the other cluster computing devices, even though they are all operating with the same central server. In some other embodiments, one of the local client computing devices in each cluster is designated with an additional role of the cluster computing device for that cluster.

This clustering, and in particular the designation of a cluster computing device for each cluster, means that the solution described herein is highly scalable, and easily manageable, while still allowing the benefits of federated learning using a hierarchical solution, as described in more detail below. Specifically, it means that the central server computing device 60 does not need to maintain a communication channel with each individual local client computing device (of which there may be a very large number), but instead only needs to maintain a communication channel with each cluster computing device 80, 82.

During an initial set-up phase, the central server computing device 60 receives information from each local client computing device 70, 72, 74, 76. For example, the central server computing device 60 may receive information about the hardware in use at a site, including the site configuration, and may receive information about the expected radio traffic at the site.

Based on that received information, the central server computing device 60 runs a suitable clustering method (for example the K-Means algorithm, or Density-Based Spatial Clustering of Applications with Noise (DBSCAN), or any suitable alternative) to identify the required number of clusters and the memberships of the clusters, so that sites within the same cluster should reach a desired similarity threshold (e.g., >=80%), for example as measured by the Euclidean distance, Cosine similarity, Jaccard similarity, or Manhattan distance.

In addition, when performing the clustering, the central server computing device 60 may take account of the locations of the local client computing devices 70, 72, 74, 76, so that the local client computing devices 70, 72, 74, 76 in each cluster are relatively close to each other. If this can be achieved, then it reduces the data transfer and communication paths, since each local client computing device 70, 72, 74, 76 communicates primarily with its own cluster computing device.

The central server computing device 60 then appoints a cluster computing device 80, 82 for each identified cluster, either by creating a virtual cluster computing device, or by selecting one of the local client computing devices 70, 72, 74, 76 in the cluster to take the role of the cluster computing device 80, 82. As shown by the arrows 90, 92, the central server computing device 60 informs each cluster computing device 80, 82 of its appointment, and also informs each cluster computing device 80, 82 of the identities of the local client computing devices 70, 72, 74, 76 in the cluster.

During further operation of the system, the central server computing device 60 continues to receive information about the operation of the system, and remains responsible for cluster management tasks such as: adding and/or removing clusters (for example if the sites associated with the local client computing devices 70, 72, 74, 76 in one cluster begin to diverge from each other, or if they begin to converge with the sites associated with the local client computing devices 70, 72, 74, 76 in another cluster), dynamically adjusting cluster memberships (for example if one site appears to have become closer to the sites associated with the local client computing devices 70, 72, 74, 76 in a different cluster from the cluster that it is currently a member of), and selecting the cluster computing devices 80, 82 that are associated with the clusters (for example if an existing cluster computing device 80, 82 goes down, or if a new cluster is formed).

As mentioned above, during the operation of the system, the central server computing device 60 is able to determine that a site should switch from membership of a first cluster to membership of a second cluster, if its performance is no longer consistent with membership of the first cluster. However, if it seems that such a switch is proposed frequently for a specific site (that is, the number of switches has exceeded a certain number within a given time period), then this could suggest that the performance of the site has become anomalous in some way, and hence the site could be marked for further investigation, for example to determine whether its hardware and/or software are malfunctioning, whether it is suffering from traffic congestion, or whether there is some other issue.

When the clusters have been formed, a form of Federated Learning takes place within each cluster. Thus, as shown by the arrows 100, 102, 104, 106, each cluster computing device 80, 82 shares a performance model with each of the local client computing devices 70, 72, 74, 76 in its cluster.

The performance model links various input parameters or configuration parameters (that can be set by the operator for a particular site or that are determined by the properties of the site) with a number of output parameters (that represent the performance of the site). The performance model may be generated by the cluster computing device itself, or an initial global model may be shared by the central server with each cluster computing device, and then shared by the cluster computing device with the local client computing devices in its cluster.

The input parameters can include such features as:
the number of radio transceivers on the site;
the type of radio transceivers, and the frequency bands;
the transmit/receive configuration on the site;
the extracted radio scheduled traffic, corresponding to the data transmitted by UEs served by the site;
the energy sources that are connected;
which energy-saving features are activated on the specific site.

The output parameters can include parameters relating to the energy performance (that is, the power consumption) of the site, and parameters relating to the service level produced by the site (for example expressed in terms of compliance with customer SLAs, QoS requirements, and the like).

Then, during operation of the system, each local client computing device 70, 72, 74, 76 obtains data relating to the performance of the respective site. As is conventional in Federated Learning, each local client computing device 70, 72, 74, 76 is able to modify the performance model that is running at that site, and reports back to the respective cluster computing device 80, 82, as shown by the arrows 108, 110, 112, 114 in FIG. 3.

Based on the information received from its associated local client computing devices 70, 72, 74, 76, each cluster computing device 80, 82 is then able to modify the performance model that it holds for the cluster, and can inform the respective local client computing devices 70, 72, 74, 76 in the cluster about the modifications to the cluster model.

Thus, because each cluster computing device 80, 82 is associated with a group of local client computing devices 70, 72, 74, 76 that have been clustered based on the general similarity of their situations, the performance model updates that are made by a cluster computing device 80, 82 can be expected to be generally appropriate for all of the associated local client computing devices 70, 72, 74, 76. This avoids the problem that a central server computing device 60 may update its global model based on information received from very disparate end nodes, and those end nodes may update their local models in the same way, even though the updates are not appropriate for it. In this way, the effects of data noise, where a model is used by sites with different characteristics and updated based on information from all of those sites, are avoided.

Meanwhile, each local client computing device 70, 72, 74, 76 can make modifications to optimize the performance model that it holds, in order to take account of its own very specific requirements. The local client computing device 70, 72, 74, 76 can then perform inference tasks based on its own updated version of the performance model. For example, the local client computing device 70, 72, 74, 76 can use its own updated version of the performance model to predict the effects of certain input data on the system. In addition, or alternatively, the local client computing device 70, 72, 74, 76 can use its own updated version of the performance model to diagnose the reasons for service problems, referred to as root cause inference.

In addition, each cluster computing device 80, 82 monitors the performance of its associated group of local client computing devices 70, 72, 74, 76. When it detects a problem in one of the local client computing devices 70, 72, 74, 76 (for example a higher power usage than has been normal for a similar state of operation, or a worse Quality of Service, or a lower throughput), a cloning functionality is triggered.

Specifically, the respective cluster computing device 80, 82 identifies which other one of the local client computing devices 70, 72, 74, 76 has a power parameter distribution that is closest to the local client computing device 70, 72, 74, 76 whose performance has degraded and become problematic.

The cluster computing device 80, 82 then instructs that identified other one of the local client computing devices 70, 72, 74, 76 to inform the local client computing device 70, 72, 74, 76 whose performance has degraded of its input power parameter values.

Thus, the local client computing device 70, 72, 74, 76 that is identified by the cluster computing device 80, 82 as the source of the cloning will send its updated model, and its input parameter values, to the local client computing device 70, 72, 74, 76 that has been identified by the cluster computing device 80, 82 as poorly performing, and hence as the destination of the cloning. The local client computing device 70, 72, 74, 76 that is the destination of the cloning then updates its own performance model based on the received cloning information. This is advantageous in the situation where the poor performance of the local client computing device 70, 72, 74, 76 that is the destination of the cloning occurs because it does not have enough training samples to be able to properly customize its performance model to its own environment. Specifically, this provides a low latency method to allow the poorly performing local client computing device 70, 72, 74, 76 to improve its performance. After the cloning has occurred, the destination of the cloning can continue to participate in the Federated Learning in the normal way, further modifying its performance model based on its performance data, and reporting such modifications to the cluster computing device 80, 82.

The local client computing device 70, 72, 74, 76 that is identified by the cluster computing device 80, 82 as the source of the cloning can send its updated model, and its input parameter values, directly to the local client computing device 70, 72, 74, 76 that has been identified by the cluster computing device 80, 82 as the destination of the cloning, as shown by the arrows 116, 118 in FIG. 3. For example, the source of the cloning can send the information to the destination of the cloning using the X2 interface that exists between Radio Base stations. This provides low latency communication, without requiring communication with other network nodes.

As mentioned above, each cluster computing device 80, 82 monitors the performance of its associated group of local client computing devices 70, 72, 74, 76. Any sites whose performance deviates from the norm, for example by having excessive power consumption, can be analyzed in relation to the other sites in the same cluster to identify the reasons for the discrepancy. For example, the site may be lacking some hardware or there may be a hardware misconfiguration, there may be a disadvantageous configuration in the radio bands, or the number of transceivers may not be ideal. If it can be determined that one of these issues is causing excessive power usage, suitable correcting action may be taken.

Figure 4:
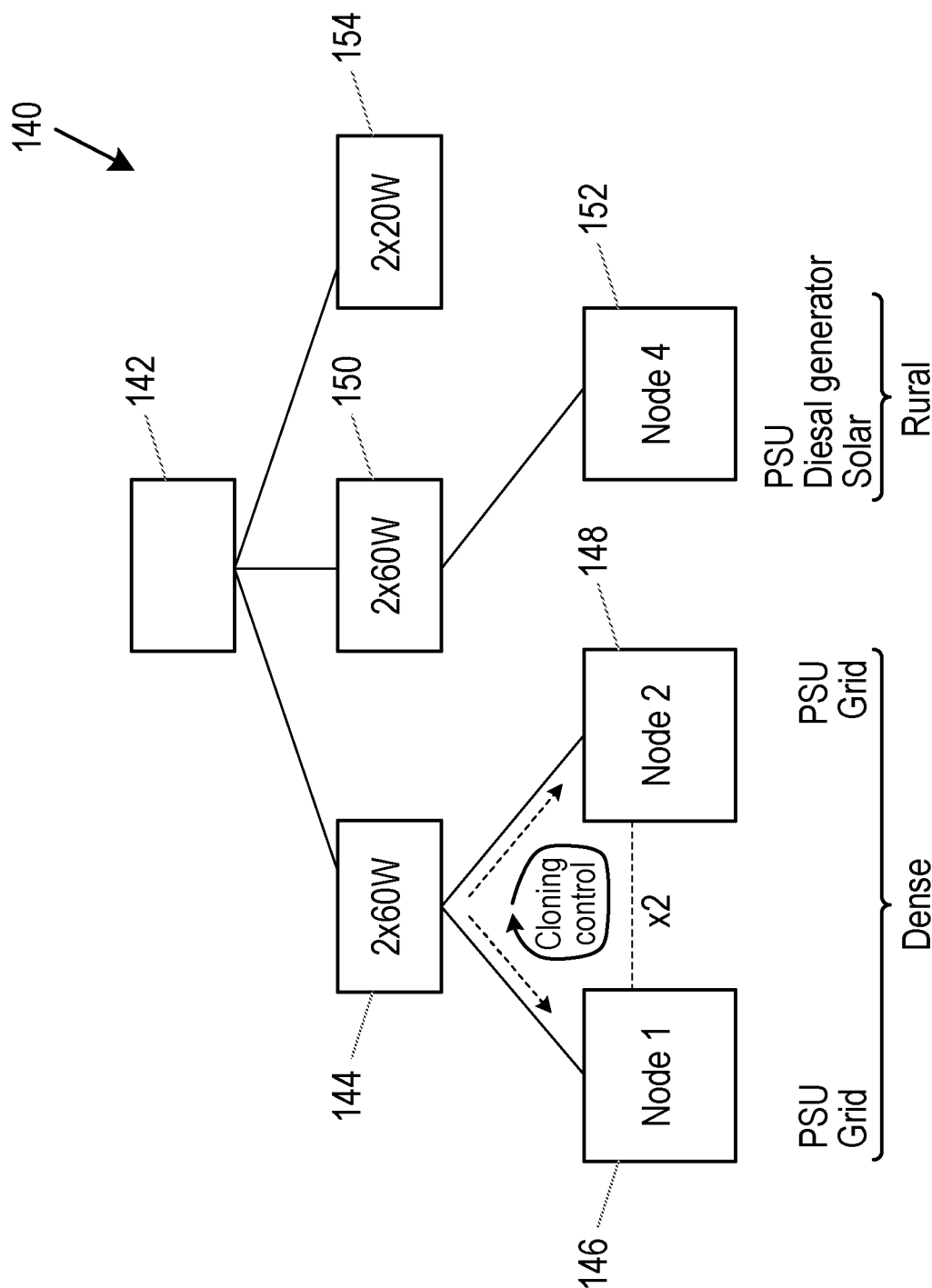
FIG. 4 illustrates operation of the arrangement of FIG. 3.

FIG. 4 illustrates the operation of a system in accordance with an embodiment, in one example.

Specifically, FIG. 4 shows an embodiment of a part of a Radio Access Network 140, in which a master server node or computing device, or central server, 142 has defined three clusters, parts of which are illustrated in FIG. 4. It will be appreciated that a real network will include a large number of network nodes, and that each cluster will in practice contain many such network nodes.

FIG. 4 shows a part of a first cluster, in which a cluster computing device 144 performs Federated Learning with a local client computing device 146 at a first network node (Node 1) and with a local client computing device 148 at a second network node (Node 2), amongst others. FIG. 4 also shows a part of a second cluster, in which a cluster computing device 150 performs Federated Learning with a local client computing device 152 at a network node (Node 4), amongst others. FIG. 4 also shows a part of a third cluster, in which a cluster computing device 154 performs Federated Learning with a number of local client computing devices (not shown in FIG. 4).

This clustering is appropriate because Node 1 and Node 2 both have two 60 W transmitters, and both receive their power supply from the electrical grid, and are located in densely populated areas. Thus, it is appropriate that they should be within the same cluster.

Meanwhile, although Node 4 also has two 60 W transmitters, it has solar and diesel generator power supplies, and it is located in a rural area. It can therefore be expected that it will have different traffic characteristics from Node 1 and Node 2, and the relevant power consumption considerations are different from Node 1 and Node 2. Thus, it is appropriate that Node 4 should be within a different cluster from Node 1 and Node 2.

In addition, the cluster computing device 154 is associated with a number of nodes (not shown in FIG. 4) that have two 20 W transmitters, and so the relevant power consumption considerations are different from Nodes 1, 2 and 4, and so it is appropriate that these nodes should be within a different cluster from Nodes 1, 2 and 4.

Thus, in FIG. 4, the cluster computing device 144 performs Federated Learning with the nodes of the first cluster, in particular with the local client computing device 146 at the first network node (Node 1) and with the local client computing device 148 at the second network node (Node 2), amongst others. That is, each of the network nodes can make its own modifications to its own performance model, and can feed information about these modifications back to the cluster computing device 144. The cluster computing device 144 can modify the cluster model if required, and can feed information about these changes down to the individual network nodes, for them to incorporate in their own performance models if appropriate.

If the cluster computing device 144 determines that the performance of one of the network nodes has become unacceptable, it can instruct another of the network nodes of the cluster to send cloning information to the node with the unacceptable performance.

Figure 5A:
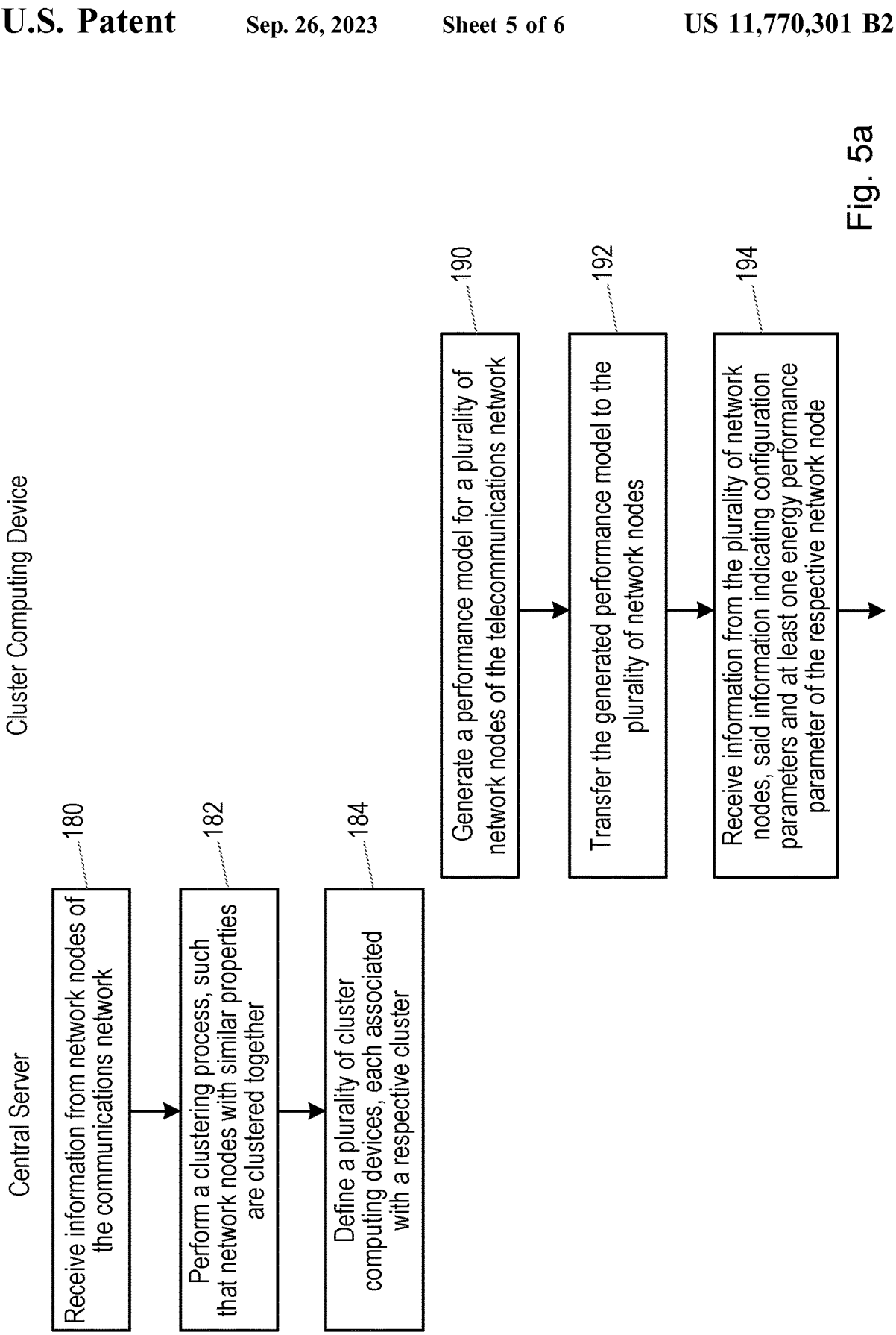
FIG. 5 is a flow chart illustrating a method in accordance with embodiments described herein.
Figure 5B:
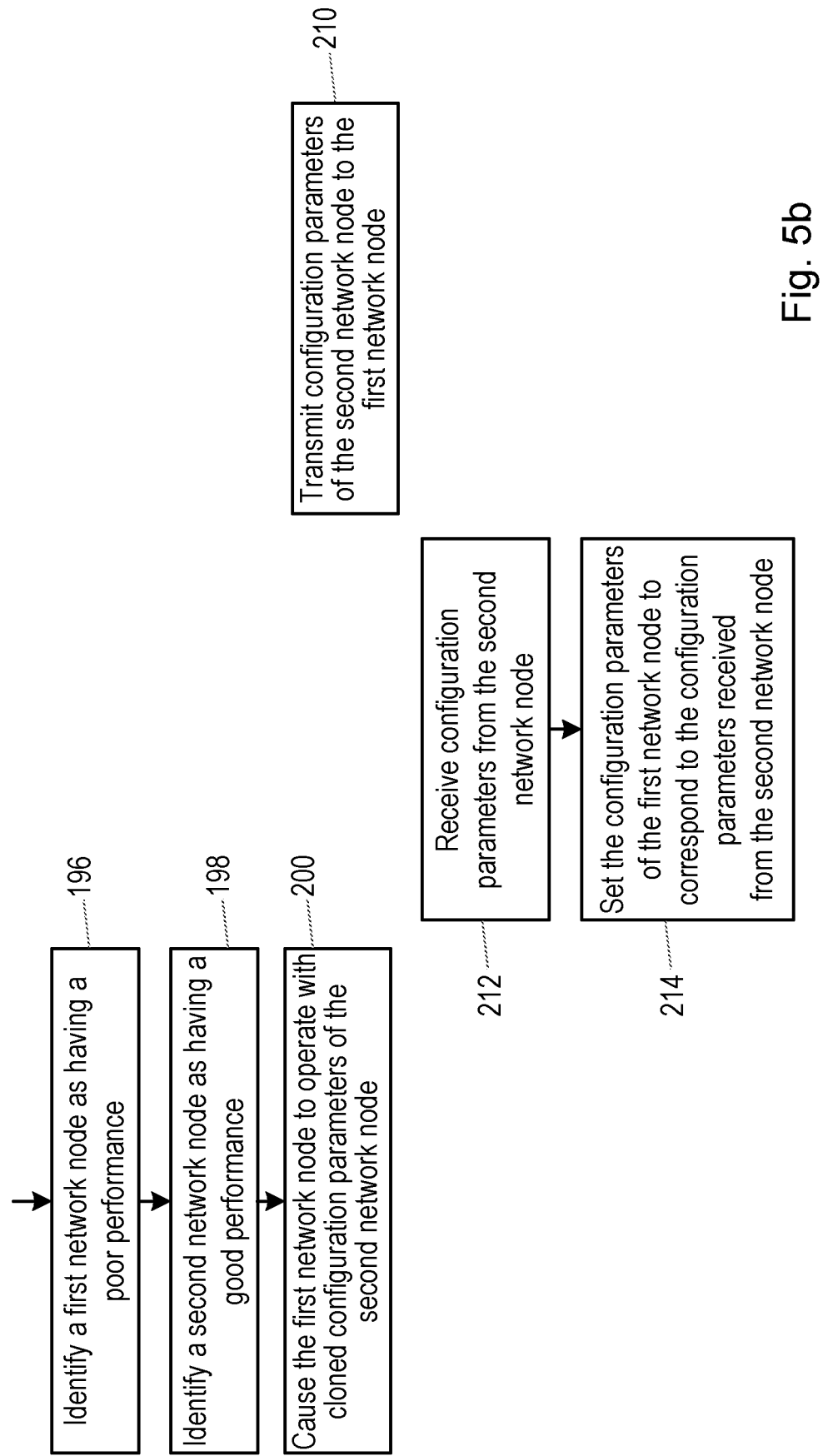

FIG. 5 is a flow chart, illustrating methods in accordance with the disclosure.

The method begins at step 180, in which a central server computing device 60 in a communications network receives information from network nodes of the communications network.

At step 182, the central server computing device 60 performs a clustering process such that network nodes with similar properties are clustered together. In addition, in step 184, the central server computing device 60 defines a plurality of cluster computing devices 80, 82, each associated with a respective cluster comprising a respective plurality of said network nodes of the communications network.

At step 190, one of the cluster computing devices 80, 82 generates a performance model for a plurality of network nodes of the communications network. The performance model relates configuration parameters of a network node to at least one energy performance parameter of the network node.

At step 192, the cluster computing device 80, 82 transfers the generated performance model to the plurality of network nodes in the respective cluster.

During operation of the network, in step 194, the cluster computing device 80, 82 receives information from the plurality of network nodes, said information indicating configuration parameters and at least one energy performance parameter of the respective network node. Based on the information received from the plurality of network nodes, the cluster computing device 80, 82 may update the performance model as required.

Still during the operation, the cluster computing device 80, 82 monitors the performance of each of the network nodes. In step 196, it identifies a first network node of said plurality of network nodes as having a poor performance.

When one network node of said plurality of network nodes is identified as having a poor performance, in step 198 the cluster computing device 80, 82 identifies a second network node of said plurality of network nodes as having a good performance.

In step 200, the cluster computing device 80, 82 then takes steps to cause the first network node to operate with cloned configuration parameters of the second network node.

Thus, in step 210, a local client computing device 70, 72, 74, 76 associated with the second network node transmits configuration parameters of the second network node to the first network node.

Then, in step 212, a local client computing device 70, 72, 74, 76 associated with the first network node receives configuration parameters from the second network node In step 214, the local client computing device 70, 72, 74, 76 associated with the first network node sets the configuration parameters of the first network node to correspond to the configuration parameters received from the second network node.

Thus, there is disclosed a system which allows site anomalies and malfunctions, for example higher energy consumption than normal, to be identified and allows dynamic energy performance improvements and control.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form. The computer program can therefore be provided on a carrier which comprises one of an electronic signal, optical signal, radio signal or computer readable storage medium. A computer program product may comprising non transitory computer readable media having stored thereon such a computer program.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single

The invention claimed is:

1. A method of operation of a communications network, the method comprising:
   in a cluster computing device:
   generating a performance model for a plurality of network nodes of the communications network, wherein the performance model relates configuration parameters of a network node to at least one energy performance parameter of the network node;
   transferring the generated performance model to the plurality of network nodes;
   receiving information from the plurality of network nodes, said information indicating configuration parameters and at least one energy performance parameter of the respective network node;
   identifying a first network node of said plurality of network nodes as having a poor performance;
   identifying a second network node of said plurality of network nodes as having a good performance; and
   causing the first network node to operate with cloned configuration parameters of the second network node; and
   the method further comprising:
   in a local client computing device associated with the second network node:
   transmitting configuration parameters of the second network node to the first network node; and
   in a local client computing device associated with the first network node:
   receiving configuration parameters from the second network node; and
   setting the configuration parameters of the first network node to correspond to the configuration parameters received from the second network node.

2. A method according to claim 1, further comprising,
   in a central server computing device in the communications network:
   receiving information from network nodes of the communications network;
   performing a clustering process such that network nodes with similar properties are clustered together; and
   defining a plurality of cluster computing devices, each associated with a respective cluster comprising a respective plurality of said network nodes of the communications network.

3. A method according to claim 1, wherein the network nodes are radio access nodes of a telecommunications network.

4. A communications network, comprising at least one cluster computing device, and a plurality of local client computing devices, wherein the cluster computing device, and the plurality of local client computing devices are configured such that the communications network performs a method in accordance with claim 1.

5. A computer program product comprising a non-transitory computer readable medium having stored thereon a computer program comprising instructions which, when executed on at least one processor, cause one or more processor to carry out a method in accordance with claim 1.

6. A method of operation of a computing device in a communications network, the method comprising:
   generating a performance model for a plurality of network nodes of the communications network, wherein the performance model relates configuration parameters of a network node to at least one energy performance parameter of the network node;
   transferring the generated performance model to the plurality of network nodes;
   receiving information from the plurality of network nodes, said information indicating configuration parameters and at least one energy performance parameter of the respective network node;
   identifying a first network node of said plurality of network nodes as having a poor performance;
   identifying a second network node of said plurality of network nodes as having a good performance; and
   causing the first network node to operate with cloned configuration parameters of the second network node.

7. The method according to claim 6, comprising causing the first network node to operate with cloned configuration parameters of the second network node by instructing the second network node to send said configuration parameters to the first network node.

8. The method according to claim 7, comprising instructing the second network node to send said configuration parameters over an X2 interface to the first network node.

9. The method according to claim 6, comprising:
   updating the generated performance model based on information received from the plurality of network nodes.

10. The method according to claim 6, wherein the network nodes are radio access nodes of a telecommunications network.

11. A computing device for use in a communications network, the computing device comprising a processor and a memory, wherein the memory contains program instructions such that the processor is configured to perform a method in accordance with claim 6.

12. A computer program product comprising a non-transitory computer readable medium having stored thereon a computer program comprising instructions which, when executed on at least one processor, cause one or more processor to carry out a method in accordance with claim 6.

13. A method of operation of a network node in a communications network, the method comprising:
   receiving information from a cluster computing device, said information defining a performance model, wherein the performance model relates configuration parameters of the network node to at least one energy performance parameter of the network node;
   setting the configuration parameters of the network node based on said performance model;
   updating said performance model, based on the at least one energy performance parameter of the network node; and
   when instructed by said cluster computing device, sending said configuration parameters to at least one other network node, or
   when receiving configuration parameters from another network node, setting the configuration parameters of the network node to correspond to the configuration parameters received from the other network node.

14. The method according to claim 13, comprising:
   sending information about updates of said performance model to the cluster computing device.

15. The method according to claim 13, comprising sending said configuration parameters over an X2 interface to said plurality of network nodes.

16. A method according to claim 13, wherein the network node is a radio access node of a telecommunications network.

17. A network node for use in a communications network, the network node comprising a processor and a memory, wherein the memory contains program instructions such that the processor is configured to perform a method in accordance with claim 13.

18. A computer program product comprising a non-transitory computer readable medium having stored thereon a computer program comprising instructions which, when executed on at least one processor, cause one or more processor to carry out a method in accordance with claim 13.

* * * * *